United States Patent
Pappas et al.

[11] Patent Number: 5,818,572
[45] Date of Patent: Oct. 6, 1998

[54] TWO-DIMENSIONAL MODULATION TRANSFER FUNCTION MEASUREMENT TECHNIQUE

[75] Inventors: Michael Lee Pappas, Anaheim; Harold J. Orlando, Costa Mesa, both of Calif.

[73] Assignee: Northrop Grumman Corporation, Los Angeles, Calif.

[21] Appl. No.: 639,015

[22] Filed: Apr. 24, 1996

[51] Int. Cl.⁶ .............................................. G01M 11/00
[52] U.S. Cl. .............................................. 356/124.5
[58] Field of Search ........................ 356/124, 124.5; 382/141

[56] References Cited

U.S. PATENT DOCUMENTS

| | | |
|---|---|---|
| 3,743,427 | 7/1973 | Weiser . |
| 3,938,892 | 2/1976 | Klingman, III ............... 356/124.5 |
| 4,241,996 | 12/1980 | Weiser ......................... 356/124.5 |
| 4,582,427 | 4/1986 | Hutchin ........................ 356/124.5 |
| 4,641,963 | 2/1987 | Levine ......................... 356/124.5 |
| 4,772,120 | 9/1988 | Pointeau ....................... 356/124.5 |
| 4,807,981 | 2/1989 | Takizawa et al. . |
| 4,970,593 | 11/1990 | Cantrell ........................ 358/166 |
| 5,033,015 | 7/1991 | Zwirn .......................... 364/579 |
| 5,043,930 | 8/1991 | Lin ............................. 364/578 |
| 5,075,883 | 12/1991 | Friedman et al. ............. 364/553 |
| 5,083,204 | 1/1992 | Heard et al. . |
| 5,172,227 | 12/1992 | Tsai et al. . |
| 5,221,834 | 6/1993 | Lisson et al. ................. 356/124.5 |
| 5,303,023 | 4/1994 | Portney et al. ................ 356/124.5 |
| 5,369,357 | 11/1994 | Erhardt . |
| 5,402,225 | 3/1995 | Stubbs et al. ................. 356/124.5 |

OTHER PUBLICATIONS

G. Groh et al., "Simple and Fast Method for the Presentation of the Two–Dimensional Modulation Transfer Function of X–Ray Systems", Jul. 1993, vol. 12, No. 7, Applied Optics, pp. 1693–1697.

*Primary Examiner*—Hoa Q. Pham
*Attorney, Agent, or Firm*—Terry J. Anderson; Karl J. Hoch, Jr.

[57] ABSTRACT

Modulation Transfer Function of an electro-optical sensor is measured by focusing a square or rectangular target image onto the sensor and deriving the Modulation Transfer Function in two directions simultaneously from an output of the sensor. The target image is tilted with respect to the sensor's focal plane array such that the target image's edges cross different detector elements at different phases. The target image can be rotated over finely spaced intervals. Modulation Transfer Function can be derived using a least squares method or using a one-dimensional Fourier Transform in both horizontal and vertical directions.

37 Claims, 3 Drawing Sheets

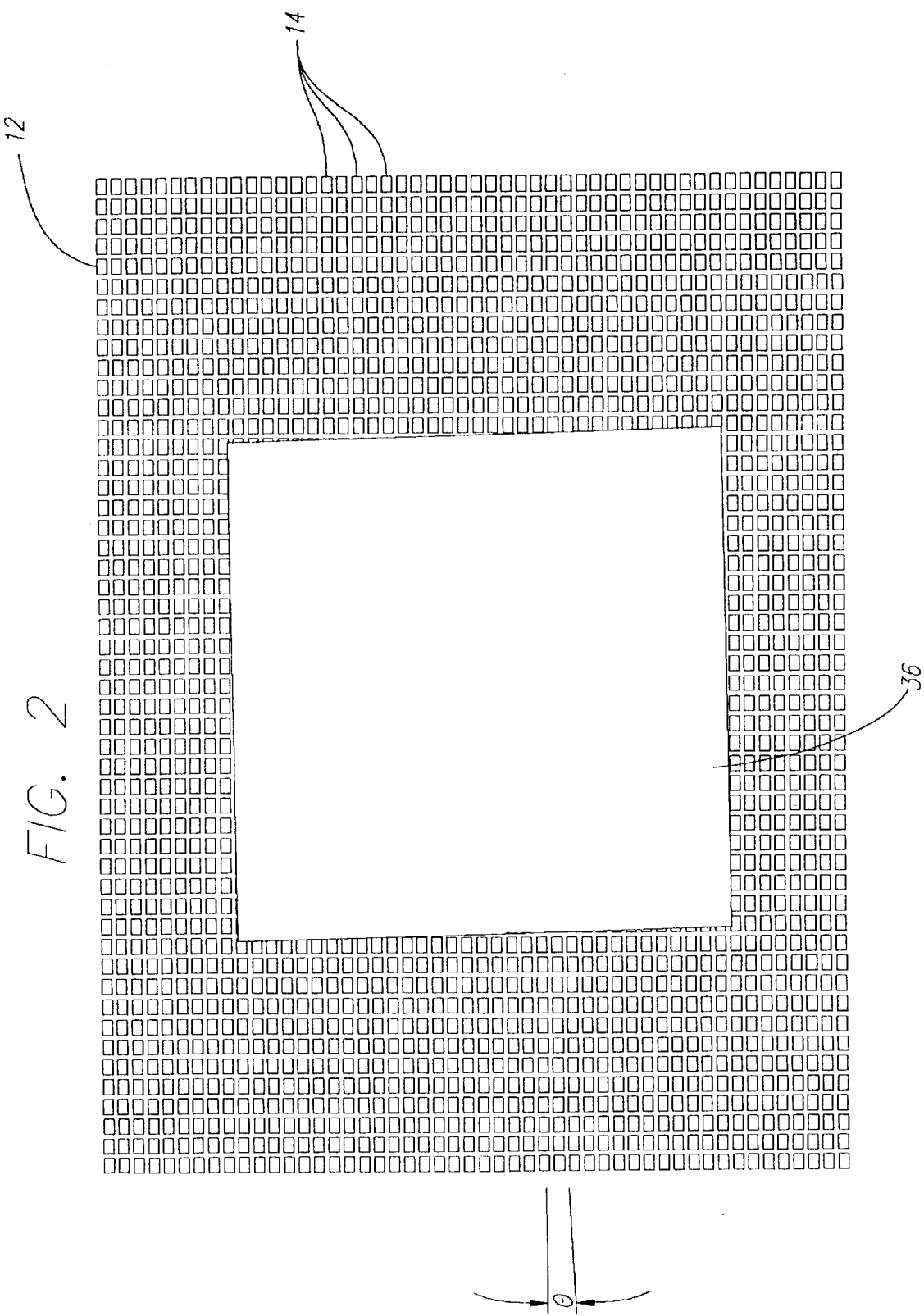

TWO-DIMENSIONAL MODULATION TRANSFER FUNCTION MEASUREMENT TECHNIQUE

FIELD OF THE INVENTION

The invention relates in general to electro-optical imaging sensors and in particular to an apparatus and method for measuring the Modulation Transfer Function (MTF) of an electro-optical sensor.

BACKGROUND OF THE INVENTION

An electro-optical sensor is a device that converts radiant energy of a particular wavelength or range of wavelengths into an electrical signal. One example of an electro-optical sensor is a handheld TV camera, which converts images of visible light into an electrical signal that can be stored in electronic memory or displayed on a television screen. Another example of an electro-optical sensor is a Forward Looking Infrared ("FLIR") sensor which converts images of infrared energy (i.e., heat), invisible to the human eye, into an electrical signal that can be displayed to a viewer. Because all objects radiate heat, the FLIR has the ability to "see at night." This ability has led to wide usage of the FLIR in military navigation and targeting systems and, more recently, in commercial security systems.

The capability of the electro-optical sensor to resolve the details of an object is referred to as its "resolution." Increasing the resolution allows the sensor to identify objects at greater distances. Higher resolution allows the FLIR, for example, to identify an enemy target before that target gets too close.

A useful measure of the resolution of the electro-optical sensor is provided by a Modulation Transfer Function ("MTF"). MTF is determined by presenting an impulse to a sensor and analyzing the resulting video signal for sharpness of image. The impulse can be created by imaging a slit target onto the sensor, or by imaging an optical step function target and taking the derivative of the step (the derivative of a step function is an impulse). The resulting video signal is analyzed by calculating the magnitude (modulus) of the Discrete Fourier Transform (DFT) or Fast Fourier Transform (FFT), and normalizing the resulting real-valued sequence to unity at zero spatial frequency term.

Another useful measure of sensor resolution is provided by a Square Wave Response ("SWR"), also known as a Contrast Transfer Function ("CTF"). SWR is determined by imaging a bar chart target onto a sensor and determining a normalized curve of peak-to-peak output as a function of spatial frequency. MTF at desired spatial frequencies can then be calculated as linear combinations of the SWR measurements. Weighting factors in the linear combinations are determined by Fourier coefficients of a square wave.

For both MTF and SWR, the target is oriented perpendicular to the desired direction for the resolution measurement. When resolution is measured in a horizontal direction, the bar lengths are oriented in a vertical direction. When resolution is measured in the vertical direction, the bar lengths are oriented in the horizontal direction. When resolution must be measured in both directions, the bar lengths are oriented vertically and sensor resolution in the horizontal direction is measured. Then the orientation of the bar lengths is changed from the vertical direction to the horizontal direction (or a different target is used) and sensor resolution is measured in the vertical direction.

A major drawback of these measurement techniques is that resolution can be measured only in a single direction at any given time.

Another major drawback of these techniques is their sensitivity to the phase of the target. If, following a first measurement, a second measurement is performed with the target being displaced by a fraction of a sampling interval or by a non-integral number of sampling intervals, the first and second measurements will in general yield different results.

It is an objective of the present invention to improve the repeatability and accuracy of measuring the MTF of an electro-optical sensor.

It is another objective of the invention to increase the speed in measuring the MTF of an electro-optical sensor.

SUMMARY OF THE INVENTION

These objectives are accomplished by the present invention. For an electro-optical sensor having a focal plane array including a plurality of detector elements of a given shape, resolution is measured in two directions by apparatus comprising a target generator, at least one optical element, and a signal processor. The target generator includes a mask having an aperture and a source of irradiation behind the mask. The aperture has a shape that corresponds to the shape of the detector elements. When the mask is irradiated by the source of irradiation, a target image is focused onto the sensor by the at least one optical element. The signal processor derives the MTF of the sensor in the two directions from an output of the sensor after the target image is focused onto the detector elements.

According to other aspects of the present invention, the aperture has at least one pair of edges that are precisely oriented. The aperture can have a square or rectangular shape. Each edge of the target image can be tilted to cross different detector elements at different phases.

The size of the target image depends upon the measurement being performed. Edges of the target image are focused near edges of the sensor's field-of-view when off-axis resolution is measured. Edges of the target image are focused near the center of the sensor's field-of-view when on-axis resolution is measured.

The signal processor can derive MTF in the two directions simultaneously from an output of the sensor. Horizontal and vertical MTF can be derived by performing a Fourier transform on each row and column of data from the sensor (when the detector elements are arranged in an array) and deriving magnitudes of the transform for each row and column. In the alternative, horizontal and vertical MTF can be derived by determining the error between an image detected by the sensor and a simulated image based on estimated horizontal and vertical optical MTF, and adjusting the estimated horizontal and vertical MTF until the error between the detected and simulated images has been minimized. Tilt angle of the target can also be derived simultaneously with the horizontal and vertical sensor MTF.

BRIEF DESCRIPTION OF THE DRAWINGS

FIG. 2 is a schematic diagram of a focal plane array and a target image, the focal plane array forming a part of the electro-optical sensor, the target image being generated by a target generator shown in FIG. 1;

DETAILED DESCRIPTION OF THE PREFERRED EMBODIMENTS

Figure 1:
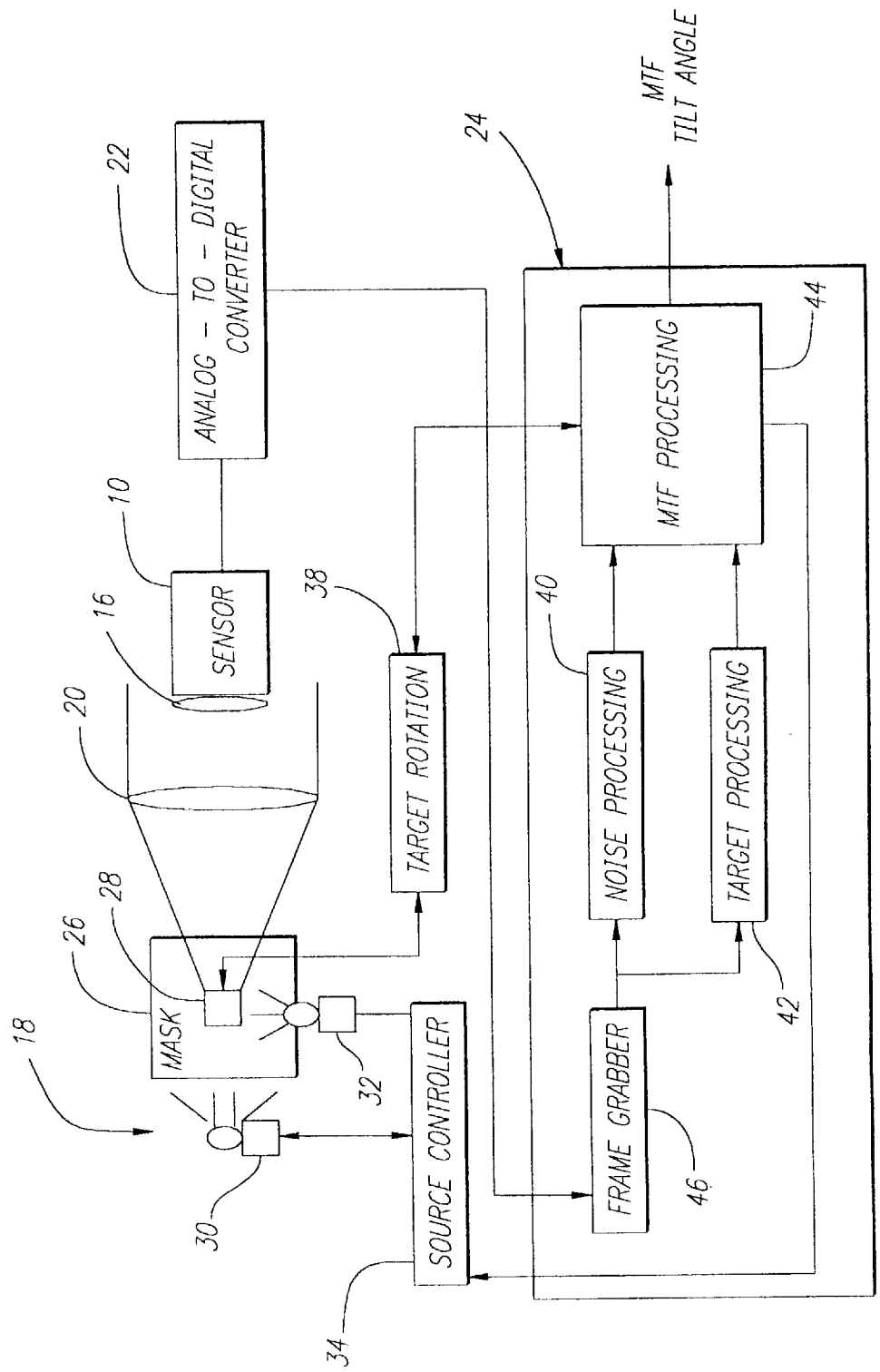
FIG. 1 is a schematic diagram of an electro-optical sensor and apparatus for measuring horizontal and vertical MTF of the electro-optical sensor in accordance with the present invention.

FIGS. 1 and 2 show an electro-optical sensor 10 under test in accordance with the present invention. The electro-optical sensor 10 includes a focal plane array 12 comprising a plurality of detector elements 14 and a readout integrated circuit (not shown) for each detector element 14. Each detector element 14 is sensitive to a particular range of wavelengths. The focal plane array 12 could be a Charge Coupled Device ("CCD") that is sensitive to wavelengths in the visible spectrum, or it could be a cooled or uncooled IR FPA or pyroelectric device that is sensitive to wavelengths in the infrared spectrum. The CCD is typically used in handheld cameras, and the FPA and pyroelectric device are typically used in FLIRs. The sensor 10 also includes an optical assembly 16 which focuses an image of radiant energy onto the focal plane array 12. Energy impinging each detector element 14 causes a charge to accumulate on its corresponding readout circuit. The amount of stored charge is proportional to the intensity of the energy impinging the detector element 14. After the detector elements 14 and readout circuits have accumulated the charges over a fixed time interval, the charges on the readout circuits are multiplexed row-by-row and column-by-column into one or more serial streams of detector data. These streams of detector data are commonly referred to as video signals. Usually they are combined into a single stream in a standard analog video format (RS-170, RS-330, RS-343) for video display or a standard monitor.

The electro-optical sensor 10 shown in FIGS. 1 and 2 is a staring sensor, which means that the detector elements 14 of its focal plane array 12 are arranged in a two-dimensional array and that its optical assembly 16 focuses an entire image onto the focal plane array 12. Spatial sampling in the vertical and horizontal directions is defined by the center-to-center distance between adjacent detector elements. Spatial sampling can also be affected by the sensor's electronics, which include a multiplexer and an analog-to-digital converter (if internal analog-to-digital conversion is performed).

Two-dimensional MTF of the sensor 10 is measured by a target generator 18, collimating optics 20, an analog-to-digital (A/D) converter 22 and a digital signal processor 24. The target generator 18 includes a target mask 26 having an aperture 28, a first source 30 for back irradiation of the aperture 28, a second source 32 for front irradiation of the mask 26, and a source controller 34 for controlling the first and second sources 30 and 32. The mask 26 functions as a background plate and the aperture 28 functions as a target plate. The mask 26 must be flat and thin. For example, the thickness of the mask 26 can be approximately 0.020 inches with a flatness of a couple of thousandths of an inch. However, the thickness, and flatness may vary with the application. If the thickness of the mask 26 is not negligible, the border of the mask 26 should be beveled towards the first source 30 (i.e., it should open up in the direction of the first source 30) to eliminate grazing reflections through the aperture 28. The bevel angle can be 20° or any other angle that is consistent with the optical f-number of the collimating optics 20.

For a FLIR, only the first source 30 is required to create a differential temperature between the target and background plates. However, the differential temperature can be enhanced by heating the front of the target mask 26 with the second source 32. The first and second sources 30 and 32 for a FLIR can include nichrome coils and gold-coated integrating spheres. Special coatings such as black coatings having black body emissivity greater than 97% can be applied to the nichrome coils. Metal surfaces on the mask 26 can be used to achieve good temperature uniformity. The source controller 34, which controls the differential temperature between the target and background plates, can employ temperature sensors and a simple feedback loop. The temperature sensors can be thermistors or thermocouples bonded to the mask 26.

For a TV camera, the first source 30 illuminates the aperture 26, and the second source 32 illuminates the front of the target mask 26 to create a radiance difference between the target and background plates. The first and second sources 30 and 32 for a TV camera can each include a tungsten lamp and an integrating sphere. Special lining materials such as white paint can used for the interior of the integrating sphere to promote multiple diffuse reflections and achieve spatially uniform integrating sphere radiant exitance. A visible black coating is applied to the mask 26 to minimize stray specular reflections. The source controller 34, which controls the radiance difference between the target 36 and background, can include photometers and a simple feedback loop.

The aperture 28 in the mask 26 has a shape that corresponds to the shape of the detector elements 14 in the focal plane array 12. A square shape of the aperture 28 corresponds to rectangular or square shaped detector elements 14 of the focal plane array 12. Two edges of the aperture 28 are precisely positioned. The two precisely positioned edges can be opposing edges that are precisely parallel or adjacent edges that are precisely perpendicular. If the detector elements 14 were hexagonally-shaped, the aperture 28 would have the shape of a hexagon.

The collimating optics 20 focuses the target plate onto the sensor 10. Collimation allows the target generator 18 to be positioned at practical distances from the sensor 10.

A square-shaped target image 36 is projected onto the focal plane array 12. Horizontal and vertical MTF measurements are taken at the edges of the target 36. The target image 36 is tilted at an angle $\Theta$ with respect to the horizontal field of view so as to create a different phase in each detector element 14 it crosses over. The tilt angle $\Theta$ should be selected so as to create the greatest number of different phase samples across each edge of the target image 36. When the phase samples for a given frame are processed, the different phases corresponding to each edge are averaged together to provide an average target phase for that edge. If a large enough sample size is used, the average target phase should remain constant from sensor measurement to sensor measurement, even if the target image 36 is displaced by a fraction of a sampling interval or by a non-integral number of sampling intervals.

The number of samples taken at a single target position is proportional to the size of the target image 36. A large square target that almost fills the field of view of the sensor 10 provides the greatest number of target phase samples along each edge. However, only off-axis field-of-view MTF of the sensor 10 is measured when the edges of the target image 36 are placed near the edges of the field of view. Typically on-axis sensor MTF is specified, so a much smaller square target is required to keep the edges of the target image near the center of the sensor field of view. A target image covering ten percent of the sensor's field-of view can be used for on-axis sensor MTF.

Repeatability of the MTF measurements can be increased by rotating the target image 36 to other tilt angles Θ and collecting additional samples at the other tilt angles Θ. For example, when it is mandatory to evaluate horizontal and vertical MTF over a small region (less than 10 percent), a square target image 36 covering less than 10 percent of the field of view is used and the necessary number of phase samples are collected by rotating the target in fine intervening angular increments. Each angular increment is determined by the finest spatial sampling interval (horizontal or vertical) of the sensor 10. Sufficient angular resolution is required to displace adjacent corners of the square target image 36 by this finest sampling interval.

The target image 36 can be rotated by rotating the mask 26 with a motor and associated drive electronics 38. In the alternative, the mask 26 can be rotated manually if an angular scale is provided to set the angular displacements. The mask 26 is preferably rotated about its geometric center, but can be rotated about any convenient point, such as one corner.

With the mask 26 placed at the focal plane of the collimating optics 20, the sensor 10 is set to its infinity focus setting. The sensor 10 converts a particular wavelength component or components (e.g., infrared) of the target image 36 into a video signal. The video signal can be either analog or digital.

If the video signal is analog, it is converted to a digital video signal by the A/D converter 22. The A/D converter 22 should have conversion times sufficiently small so as not to increase either the horizontal or vertical spatial sampling intervals of the sensor 10. If the video signal output by the sensor 10 is already digital (A/D conversion might be performed inside the sensor 10 to increase noise immunity of transmitted sensor data), the A/D converter 22 is not needed. Instead, only a digital interface with sufficient amplitude resolution and speed is needed between the sensor 10 the signal processor 24.

The signal processor 24 includes a noise processing module 40, a target processing module 42, and a module 44 for deriving horizontal and vertical MTF and tilt angle Θ. Noise processing can be performed according to any well known technique, such as frame averaging. In addition to removing noise, the noise processing module 40 can provide an estimate of noise in the video signal by calculating, for example, a standard deviation based on a sum of squares of the samples corresponding to a frame. Noise processing increases the signal-to-noise ratio ("SNR") of the video signal, which improves the accuracy and repeatability of the MTF measurement. Noise processing is particularly desirable for sensors 10 requiring high accuracy, such as FLIRs used in military guidance and navigation systems. When noise in the video signal is not a concern, however, noise processing can be bypassed altogether and the noise processing module 40 can be eliminated.

The target processing module 42 performs target registration when frame averaging is performed and either the target image 36 moves relative to the sensor 10 over successive frames (due to vibration or drift, for example) or the target mask 26 is not rotated about its geometric center. Target registration can be performed by any well known technique. For example, target registration can be performed by using a combination of centroid and edge detection techniques known to digital image processing. This combination focuses on a particular feature, such as an edge, and aligns the frames such that the edge images are registered over successive frames.

Figure 4:
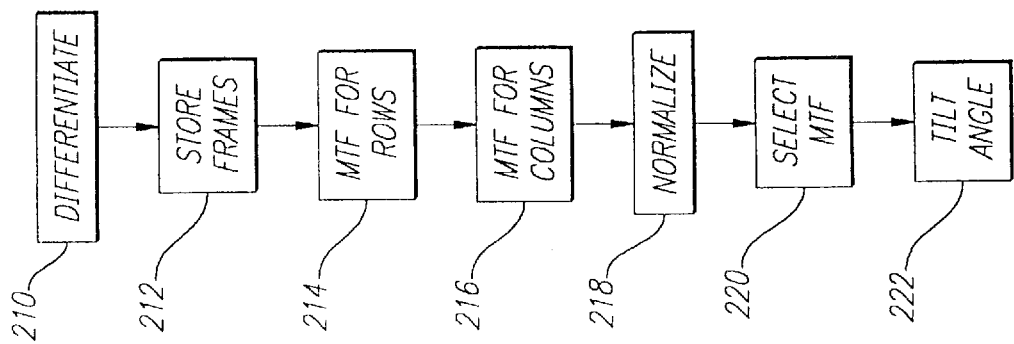
FIG. 4 is a flowchart of an alternative method for deriving horizontal and vertical MTF in accordance with the present invention.
Figure 3:
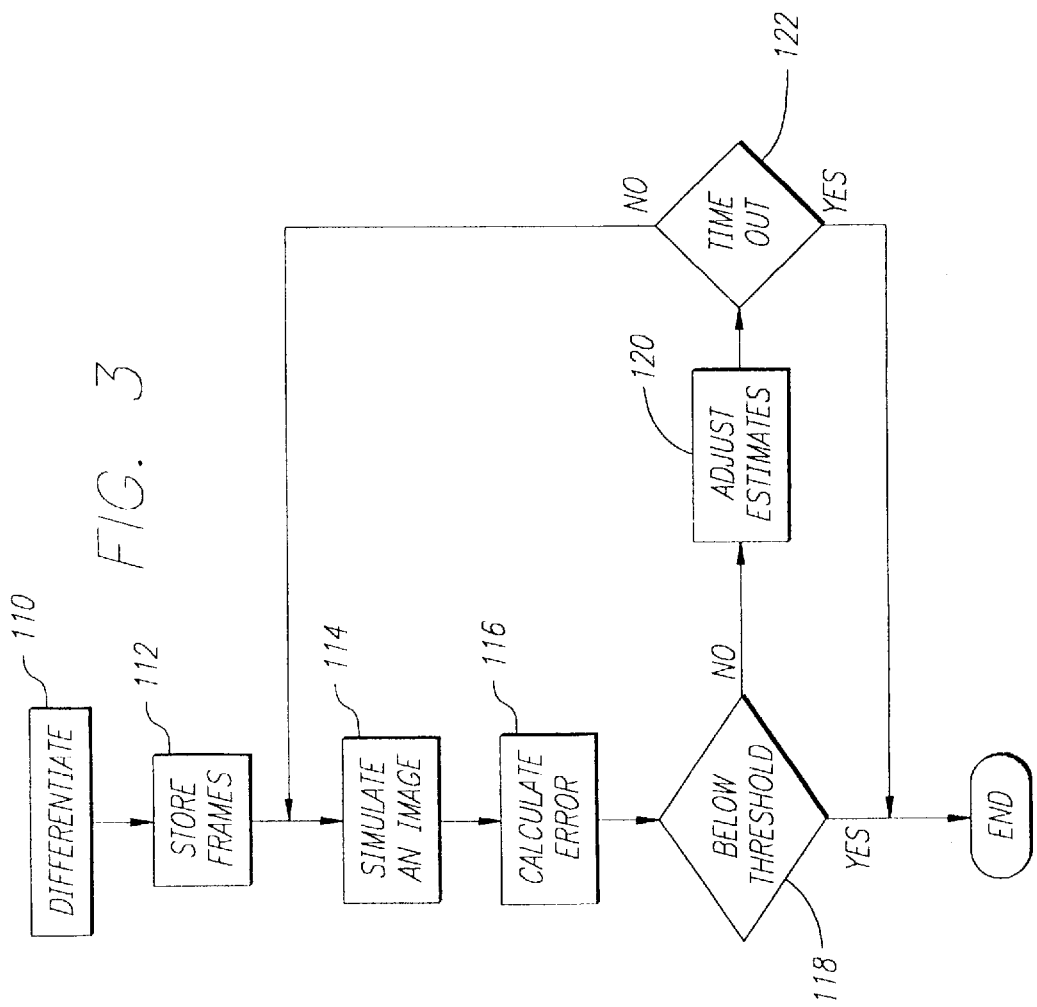
FIG. 3 is a flowchart of a method for deriving horizontal and vertical MTF in accordance with the present invention.

The MTF module 44 derives horizontal and vertical MTF of the sensor 10 and tilt angle of the target image 36 from the frames provided by either the noise processing module 40 or the A/D converter 22 (if noise processing is not performed). Routines for deriving horizontal and vertical MTF and tilt angle are shown in FIGS. 3 and 4.

The signal processor 24 can be a desktop personal computer and associated hardware and software for implementing the noise processing module 40, the target processing module 42 and the MTF module 44. A frame grabber 46 or other video data acquisition hardware capable of acquiring and storing multiple frames of video data is required if noise processing is performed. Video frame grabbers 46 are commercially available, and many are even conveniently sized to fit into one backplane slot of a desktop personal computer.

Variations in the horizontal and vertical MTF measurement technique may be invoked to trade off between speed and repeatability/accuracy. Accuracy and repeatability can be increased at the expense of speed by increasing the number of target rotations and increasing the number of frames to be averaged.

The fastest measurement utilizes a single large square target image 36 that almost fills the entire field of view of the sensor 10. The target image 36 is tilted at such an angle Θ that adjacent corners of the target image 36 are located at different spatial sampling intervals. Setting adjacent corners in adjacent sampling intervals provides the greatest number of independent phases of the target edge across the sampling interval boundary.

The most accurate MTF measurement requires precise rotations of the target image 36 at several known commanded relative angles (initially the target image 36 is rotated such that its sides are approximately parallel to the sides of the detector elements). Noise processing is performed to reduce temporal noise and target processing is performed to obtain target registration. The measurements are repeated at many finely spaced target rotations and the resulting frames of the rotated target images 36 are independently stored in the signal processor's memory.

When the target image 36 is rotated to multiple positions and the tilt angle Θ at each position is known, sensitivity of MTF in response to changes in tilt angle and can be monitored. A theoretical MTF curve can be plotted in any desired image direction along with the corresponding MTF curve for comparison. Even if the target image 36 is not rotated, sensitivity to tilt angle Θ can still be determined by simply by looking at each row independently. Tilt angle Θ can be determined for an entire row because the phase is seen as changing along any edge of the target image 36.

Reference is now made to FIG. 3, which shows a method of deriving the horizontal and vertical MTF and tilt angle from the video signal. In step 110, frames from the sensor 10 (including the step functions created by the edges of the target image 36) are differentiated in two orthogonal directions by discrete partial derivatives according to the following form:

$$\frac{df}{dx}(x_i, y_j) = [-f(x_{i+2}, y_j) + 4f(x_{i+1}, y_j) - 3(x_i, y_j)]/2A$$

$$\frac{df}{dy}(x_i, y_j) = [-f(x_i, y_{j+2}) + 4f(x_{i+1}, y_{j+1}) - 3(x_i, y_i)]/2B$$

where $f(x_i, y_j)$ is an image function, df/dx is the partial derivative in the horizontal direction, df/dy is the partial derivative in the vertical direction, A is horizontal sample period and B is vertical sample period.

In step 112, the differentiated frames are stored in the processor's memory as arrays of rows and columns, which correspond to the rows and columns of the detector elements 14 in the focal plane array 12. Each sample in an array represents the intensity of radiation detected by a corresponding detector element 14. Each frame will hereinafter be referred to as a "detected" image.

In steps 114–120, horizontal and vertical MTF are determined using a least squares method. In step 114, a simulated image is produced. The simulated image is essentially a mathematical model of how the target image 36 should be detected by the sensor 10. The target image 36 can be simulated by convolving a perfect image of the target with a smearing function. The perfect target image is a bitmap of detector element intensities having full amplitude within the target area and zero amplitude outside the target area. The perfect target image is rotated by an estimated tilt angle $\Theta_{est}$ of the target with respect to the horizontal sensor direction. The smearing function is a measure of the optical degradation due to the sensor's optical assembly 16. It is a function of the horizontal and vertical optics MTF. Detector element intensity in the simulated image ($Isim_{n,m}$) is determined as follows:

$$Isim_{n,m} = \sum_{k=-\infty}^{\infty} \sum_{l=-\infty}^{\infty} X_{k,l} \cdot Y_{n-k,m-l}$$

where n is the detector element row, m is the detector element column, $X_{k,l}$ is the intensity from a detector in the perfect image, and $Y_{n-k,\ m-l}$ is the smearing function. The perfect target image is rotated by the estimated tilt angle $\Theta_{est}$ before convolution with the smearing function. The smearing function can be modeled as a Gaussian blurred square target as follows:

$$Y_{n-k,\ m-l} = e^{-(\sigma_1(x_{n-k})^2 + \sigma_2(y_{m-l})^2)}$$

where $\sigma_1$ is the estimated horizontal blur standard deviation, and $\sigma_2$ is the estimated vertical blur standard deviation. Nominal or estimated values for the horizontal and vertical blur are used for the first calculation of the simulated image.

In step 116, an error between the simulated image and the detected image stored in the signal processor's memory is calculated. The error is determined by taking a difference between the intensity of each detector element in the simulated image and the intensity of the corresponding detector element in the detected image. The intensity difference between corresponding detector elements is squared, and the squared differences are summed over all of the detector elements. The resulting RMS error (e) can be calculated according to the following equation:

$$e = \frac{\sum_{k=1}^{N} \sum_{l=1}^{M} (Idetect_{k,l} - Isim_{k,l})^2}{NM}$$

where N is the number of rows in the focal plane array, M is the number of columns in the focal plane array, $Idetect_{k,l}$ is the intensity of the detector element at row k, column l, and $Isim_{k,l}$ is the intensity of the detector element at row k, column l of the simulated image.

In step 118, the error is compared to a threshold, such as 1%. If the error is less than the threshold (i.e., the error is at a minimum acceptable level), the least squares analysis is completed, and the final estimates are provided on an output of the MTF module 44.

If, however, the error exceeds the threshold, the estimates are adjusted (step 120), the image is simulated again using the adjusted estimates (step 114), and a new error is calculated (step 116) until the error falls below the threshold (step 118) or the test times out (i.e., errors cannot be minimized within a certain number of iterations) (step 122).

In step 120, the estimates can be adjusted in small increments, or one estimate could be adjusted while the other two estimates are held constant. In the alternative, the estimates could be adjusted using search algorithms. The search algorithms could be used to determine the magnitude and direction of the adjustments.

If the target image 36 is rotated to additional tilt angles, steps 114–120 are performed at each different tilt angle $\Theta$. The highest values among all of the MTFs are selected as the MTFs for the sensor 10.

FIG. 4 shows an alternative method for deriving horizontal and vertical MTF. A well-known one-dimensional MTF technique is utilized to calculate the horizontal and vertical MTF. The image acquired by the sensor 10, including the target edges, is differentiated (step 210) and detected images are stored in the signal processor's memory as an array of rows and columns (step 212). A one-dimensional MTF is applied to all of the rows (step 214), and then to all of the columns (step 216). The one-dimensional MTF technique transforms the array from the time domain to the frequency domain using a Fourier transform such as a Discrete Fourier Transform, and then calculates the magnitude of the Fourier transform. The value of each cell is an MTF having units expressed in cycles per milliradian (spacing of the frequency points in each dimension is equal to the reciprocal of the angular subtense of the sensor field of view). The cells are then normalized (step 218) so that the value at the 0,0 spatial frequency point is unity MTF. Element pitch, measured in milliradians, is the reciprocal of cutoff frequency, which provides an upper resolution limit where MTF falls to a neglible value. As with the least squares method, horizontal and vertical MTF are calculated simultaneously from the same set of data.

If only one tilt angle $\Theta$ is utilized, the MTFs having the highest values are selected as the horizontal and vertical MTF. If the target is rotated to additional positions, the MTF calculations above are performed at each angle, yielding a table for each angle. The highest values among all of the tables are selected as the horizontal and vertical MTF (step 220).

Since the one-dimensional MTF does not derive tilt angle, tilt angle must be derived through a least squares analysis (step 222). The target image 36 in the detected image is compared to a target of identical size in a simulated image, and the target in the simulated image is rotated until the error between the detected and simulated images has been minimized.

Thus disclosed is a technique that measures MTF simultaneously in two directions, thereby increasing the speed of performing MTF measurement in the horizontal and vertical directions. Additionally, the measurements are less sensitive to phase of the target, thereby improving the accuracy and repeatability of the MTF measurement.

Various changes and modifications may be made without departing from the spirit and scope of the present invention. For example, a rectangular aperture could be used for square-shaped detector elements. Only two precisely perpendicular edges in the aperture would be needed. Resolution would be calculated along those two edges to yield horizontal and vertical MTF.

It is understood, of course, that the present invention is not restricted to MTF measurement, but could be equally applied to other types of resolution measurements such as Optical Transfer Function measurements. It is also understood that the present invention can be applied to scanning sensors that perform spatial sampling in two directions. Finally, it is understood that the present invention can be applied to electro-optical sensors responsive to any wavelength in the electromagnetic spectrum, such as x-ray and ultraviolet wavelengths. Accordingly, the present invention is not limited to the precise embodiment described hereinabove.

What is claimed is:

1. Apparatus for measuring resolution of an electro-optical sensor having a focal plane array, the focal plane array including a plurality of detector elements of a given shape, the detector elements being arranged in rows and columns, the apparatus comprising:

a target generator including a mask having an aperture, and a source of irradiation for the aperture, the aperture having a shape that corresponds to the shape of the detector elements, whereby a target image is generated when the aperture is irradiated by the source of irradiation;

at least one optical element placed between the mask and the sensor; and a digital signal processor for deriving the MTF in two directions from an output of the sensor after the target image is focused onto the detector elements by the at least one optical element;

wherein the signal processor derives the MTF in the two directions simultaneously.

2. The apparatus of claim 1, wherein the detector elements are substantially rectangular in shape, and wherein the aperture has at least one pair of edges that are precisely positioned.

3. The apparatus of claim 1, wherein the detectors elements are substantially square-shaped, and wherein the aperture has the shape of a square with at least one pair of opposing edges being precisely positioned.

4. The apparatus of claim 1, further comprising another source of irradiation for the mask.

5. The apparatus of claim 1, wherein the at least one optical element comprises the collimating optics, and wherein the mask is located at a focal plane of the collimating optics.

6. The apparatus of claim 1, wherein the signal processor performs noise processing prior to deriving the MTF.

7. The apparatus of claim 1, wherein the signal processor further performs target registration prior to deriving the MTF.

8. The apparatus of claim 1, wherein the detector elements are arranged in an array, and wherein the signal processor derives the MTF by performing a Fourier transform on each row and column of the array, and then determining magnitudes for each row and column.

9. The apparatus of claim 8, wherein the signal processor also determines tilt angle of the target image with respect to the array.

10. The apparatus of claim 1, wherein the signal processor derives the MTF by performing a least squares analysis.

11. The apparatus of claim 10, wherein the least squares analysis is performed by comparing an image detected by the sensor to a simulated image, the simulated image being derived from estimates of sensor optics MTF; and adjusting the estimates of the MTF until an error between the detected image and the simulated image has been minimized.

12. The apparatus of claim 11, wherein the simulated image is generated by smearing a perfect image of the target, the smearing being based on the estimates of the optics MTF of the sensor.

13. The apparatus of claim 11, wherein the simulated image is an idealized Gaussian blurred square target based on the estimates of the optics MTF of the sensor.

14. The apparatus of claim 10, wherein the signal processor further uses the least squares analysis to derive tilt angle of the target simultaneously with the MTF.

15. Apparatus for measuring resolution of an electro-optical sensor having a focal plane array, the focal plane array including a plurality of detector elements of a given shape the detector elements being arranged in rows and columns, the apparatus comprising:

a target generator including a mask having an aperture, and a source of irradiation for the aperture, the aperture having a shape that corresponds to the shape of the detector elements, whereby a target image is generated when the aperture is irradiated by the source of irradiation;

at least one optical element placed between the mask and the sensor; and a digital signal processor for deriving the MTF in two directions from an output of the sensor after the target image is focused onto the detector elements by the at least one optical element;

wherein the edges of the target image are focused near edges of the sensor's field-of-view, whereby off-axis resolution is measured.

16. Apparatus for measuring resolution of an electro-optical sensor having a focal plane array, the focal plane array including a plurality of detector elements of a given shape, the detector elements being arranged in rows and columns, the apparatus comprising:

a target generator including a mask having an aperture, and a source of irradiation for the aperture, the aperture having a shape that corresponds to the shape of the detector elements, whereby a target image is generated when the aperture is irradiated by the source of irradiation;

at least one optical element placed between the mask and the sensor; and a digital signal processor for deriving the MTF in two directions from an output of the sensor after the target image is focused onto the detector elements by the at least one optical element;

wherein the edges of the target image are focused near edges of the sensor's field-of-view, whereby on-axis resolution is measured.

17. The apparatus of claim 16, wherein the target image covers no more than ten percent of the sensor's field-of-view.

18. Apparatus for measuring resolution of an electro-optical sensor having a focal plane array, the focal plane array including a plurality of detector elements of a given shape, the detector elements being arranged in rows and columns, the apparatus comprising:

a target generator including a mask having an aperture, and a source of irradiation for the aperture, the aperture having a shape that corresponds to the shape of the detector elements, whereby a target image is generated when the aperture is irradiated by the source of irradiation;

at least one optical element placed between the mask and the sensor; and a digital signal processor for deriving the MTF in two directions from an output of the sensor after the target image is focused onto the detector elements by the at least one optical element;

wherein edges of the target image are tilted to cross different detector elements at different phases.

19. Apparatus for measuring resolution of an electro-optical sensor having a focal plane array, the focal plane array including a plurality of detector elements of a given shape, the detector elements being arranged in rows and columns, the apparatus comprising:

a target generator including a mask having an aperture, and a source of irradiation for the aperture, the aperture having a shape that corresponds to the shape of the detector elements, whereby a target image is generated when the aperture is irradiated by the source of irradiation;

at least one optical element placed between the mask and the sensor; and a digital signal processor for deriving the MTF in two directions from an output of the sensor after the target image is focused onto the detector elements by the at least one optical element;

wherein the target generator further comprises means for rotating the mask such that a tilt angle of the target image can be changed.

20. Apparatus for measuring resolution of an electro-optical sensor having a focal plane array, the focal plane array including a plurality of detector elements of a given shape, the detector elements being arranged in rows and columns, the apparatus comprising:

a target generator including a mask having an aperture, and a source of irradiation for the aperture, the aperture having a shape that corresponds to the shape of the detector elements, whereby a target image is generated when the aperture is irradiated by the source of irradiation;

at least one optical element placed between the mask and the sensor; and a digital signal processor for deriving the MTF in two directions from an output of the sensor after the target image is focused onto the detector elements by the at least one optical element;

wherein the target image is rotatable in angular increments equal to a finest spatial sampling interval of the sensor.

21. Apparatus for measuring resolution of an electro-optical sensor having a focal plane array, the focal plane array including a plurality of detector elements of a given shape, the detector elements being arranged in rows and columns, the apparatus comprising:

a target generator including a mask having an aperture, and a source of irradiation for the aperture, the aperture having a shape that corresponds to the shape of the detector elements, whereby a target image is generated when the aperture is irradiated by the source of irradiation;

at least one optical element placed between the mask and the sensor; and a digital signal processor for deriving the MTF in two directions from an output of the sensor after the target image is focused onto the detector elements by the at least one optical element;

wherein the mask is rotatable about a center of mass of the mask.

22. A target generator for use in a MTF measurement of an electro-optical sensor having a focal plane array of detector elements, the detector elements having a given shape, the target generator comprising:

a mask having an aperture, the aperture and the detector elements having substantially the same shape;

a source of irradiation for the aperture; and means for rotating the mask such that a tilt angle of the aperture with respect to the focal plane array can be changed.

23. A target generator for use in a MTF measurement of an electro-optical sensor having a focal plane array of detector elements, the detector elements having a given shape, the target generator comprising:

a mask having an aperture, the aperture and the detector elements having substantially the same shape; and a source of irradiation for the aperture;

wherein the mask is rotatable about a center of mass of the mask.

24. A method of measuring Modulation Transfer Function (MTF) of an electro-optical sensor having a focal plane array, the focal plane array including a plurality of detector elements of a given shape, the detector elements being arranged in rows and columns, the method comprising the steps of:

focusing a target image onto the sensor, the target image having a shape corresponding to the shape of the detector elements; and deriving simultaneously MTF in two dimensions from an output of the sensor after the target image is focused onto a radiation-receiving surface.

25. The method of claim 24, wherein the MTF is derived by performing a least squares analysis.

26. The method of claim 25, wherein the least squares analysis is performed by comparing a detected image to a simulated image, the simulated image being derived from estimates of optics MTF of the sensor; and adjusting the estimates of the MTF until an error between the detected image and the simulated image has been minimized.

27. The method of claim 26, wherein the simulated image is generated by smearing a perfect image of the target, image based on the estimates of the MTF.

28. The method of claim 25, wherein a tilt angle is also derived by the least squares analysis.

29. A method of measuring Modulation Transfer Function (MTF) of an electro-optical sensor having a focal plane array, the focal plane array including a plurality of detector elements of a given shape, the detector elements being arranged in rows and columns, the method comprising the steps of:

focusing a target image onto the sensor, the target image having a shape corresponding to the shape of the detector elements; and deriving MTF in two dimensions from an output of the sensor after the target is focused onto a radiation-receiving surface;

wherein edges of the target image are focused near edges of a field-of-view of the sensor, whereby off-axis resolution is measured.

30. A method of measuring Modulation Transfer Function (MTF) of an electro-optical sensor having a focal plane array, the focal plane array including a plurality of detector elements of a given shape, the detector elements being arranged in rows and columns, the method comprising the steps of:

focusing a target image onto the sensor, the target image having a shape corresponding to the shape of the detector elements; and deriving MTF in two dimensions from an output of the sensor after the target is focused onto a radiation-receiving surface;

wherein edges of the target image are focused near edges of a field-of-view of the sensor, whereby on-axis resolution is measured.

31. The method of claim 30, wherein the target image covers no more than ten percent of the sensor's field-of-view.

32. A method of measuring Modulation Transfer Function (MTF) of an electro-optical sensor having a focal plane array, the focal plane array including a plurality of detector elements of a given shape, the detector elements being arranged in rows and columns, the method comprising the steps of:

focusing a target image onto the sensor, the target image having a shape corresponding to the shape of the detector elements; and deriving MTF in two dimensions from an output of the sensor after the target is focused onto a radiation-receiving surface;

wherein edges of the target image are tilted to cross different detector elements at different phases.

33. The method of claim 32, wherein the target image is rotated in angular increments equal to the finest spatial sampling interval of the sensor.

34. A method of measuring Modulation Transfer Function (MTF) of an electro-optical sensor having a focal plane array, the focal plane array including a plurality of detector elements of a given shape, the detector elements being arranged in rows and columns, the method comprising the steps of:

focusing a target image onto the sensor, the target image having a shape corresponding to the shape of the detector elements;

deriving MTF in two dimensions from an output of the sensor after the target is focused onto a radiation-receiving surface; and rotating the target image.

35. The method of claim 34, wherein the target image is rotated about its center of mass.

36. The method of claim 34, wherein noise is removed from the output of the sensor prior to deriving the MTF.

37. The method of claim 35, wherein target images are all placed in registration prior to deriving the MTF.

* * * * *